United States Patent
Ito et al.

(10) Patent No.: US 7,304,871 B2
(45) Date of Patent: Dec. 4, 2007

(54) BOOST CIRCUIT CAPABLE OF STEP-UP RATIO CONTROL

(75) Inventors: Tomoyuki Ito, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 258 days.

(21) Appl. No.: 11/087,795

(22) Filed: Mar. 23, 2005

(65) Prior Publication Data

US 2005/0219878 A1   Oct. 6, 2005

(30) Foreign Application Priority Data

Mar. 30, 2004  (JP)  ............... 2004-098461
Feb. 8, 2005   (JP)  ............... 2005-031670

(51) Int. Cl.
*H02M 3/18*   (2006.01)
*H02M 7/00*   (2006.01)

(52) U.S. Cl. .................. 363/59; 327/536; 327/108; 327/111; 327/112

(58) Field of Classification Search ............... 327/536, 327/108, 111, 112; 363/59, 60; 323/266
See application file for complete search history.

(56) References Cited

U.S. PATENT DOCUMENTS 6,504,422 B1 * 1/2003 Rader et al. ................. 327/536

FOREIGN PATENT DOCUMENTS

JP    6-78527    3/1994

OTHER PUBLICATIONS

English Abstract for Japanese Patent Application No. 6-78527 dated Mar. 18, 1994.

* cited by examiner

*Primary Examiner*—Bao Q. Vu
*Assistant Examiner*—Stuart Hansen
(74) *Attorney, Agent, or Firm*—Cantor Colburn LLP

(57) ABSTRACT

When a step-up ratio control circuit sets a step-up ratio of a charge pump circuit to 1.0 to enable a short mode, a path inside the charge pump circuit is short-circuited and a first transistor is completely turned on. This produces an inrush current derived from a battery voltage of a lithium ion battery flowing into the charge pump circuit. To address this, a constant current circuit is operated so that the first transistor is turned on slowly. Further, the operation of an oscillator and an operational amplifier is suspended when the short mode is enabled.

5 Claims, 9 Drawing Sheets

300

BOOST CIRCUIT CAPABLE OF STEP-UP RATIO CONTROL

BACKGROUND OF THE INVENTION

1. Field of the Invention

The present invention relates to a boost circuit and a voltage generating apparatus and an electronic apparatus in which the boost circuit can be used.

2. Description of the Related Art

Battery-driven portable equipment such as a portable telephone and a personal data assistant (PDA) use light-emitting diodes (LED) for a variety of purposes. For example, LEDs are used to provide backlight for a liquid crystal display (LCD) or an electronic flash light for a charge-coupled device (CCD) camera. LEDs emitting different colors are operated to blink for illumination. In order to drive an LED, the battery voltage of about 3.6V of, for example, a lithium ion battery should be boosted to about 4.5V as a drive voltage. When the battery voltage drops due to battery consumption, or when a load current flowing in the LEDs is increased, causing an increased voltage drop, the battery voltage should be boosted by a higher step-up ratio.

Thus, in the power supply apparatus for driving a target load such as LEDs, the battery voltage should be boosted by an appropriate step-up ratio in accordance with the operating condition so as to generate a drive voltage. For example, the patent document No. 1 discloses a drive voltage supplying apparatus in which a boost circuit provided with a plurality of boost capacitors is also provided with a selection switch that selects appropriate boost capacitors depending on the step-up ratio and an external selection terminal connected to the selection switch for selection of a step-up ratio.

[Patent Document No. 1]

Japanese Published Patent Application No. 6-78527

The apparatus according to the patent document No. 1 is certainly capable of boosting the power supply voltage by a desired step-up ratio. However, an excessive current may temporarily flow due to initial charge built up in the boost capacitors. Such a current is referred to as an inrush current. An inrush current may adversely affect the reliability of a power supply apparatus itself or equipment including the power supply apparatus. It may also induce improper operation of the equipment. Therefore, it is preferable that an inrush current be suppressed. Further, for control of power consumption of a battery used as a power supply for input to a power supply apparatus, it is preferable to control a consumption current in the circuit.

SUMMARY OF THE INVENTION

The present invention has been done in view of the aforementioned circumstances and its object is to provide a boost circuit enabling control of an inrush current and reduction in power consumption. Another object is to provide a voltage generating circuit and an electronic apparatus in which the boost circuit and the voltage generating apparatus can be used.

The present invention according to one aspect provides a boost circuit. The boost circuit according to this aspect comprises: a first switch group which includes a plurality of switches for charging and discharging the boost capacitance in a boost operation and includes at least two switches connected in series on a first path between an input terminal and an output terminal of the boost circuit; and a switching control circuit which performs on and off control of the plurality of switches. The switching control circuit closes the first switch group when a step-up ratio of 1.0 is designated for the boost circuit.

According to this aspect, the voltage fed to the input terminal of the boost circuit is directly output to the output terminal thereof so that power loss is reduced.

The boost circuit may further comprise a second switch group which is connected in series on a second path between the input terminal and the output terminal of the boost circuit and which includes at least two switches. The switching control circuit may close the switches in the second switch group in addition to closing the switches in the first switch group, when the step-up ratio of 1.0 is designated for the boost circuit. By establishing two short circuits between the input terminal and the output terminal, resistance derived from the switches is reduced so that power loss is further reduced.

The present invention according to another aspect provides a voltage generating apparatus. The voltage generating apparatus according to this aspect comprises: a boost circuit which boosts an input voltage by a predetermined step-up ratio and outputs an output voltage accordingly; a regulator circuit which regulates the input voltage so that the output voltage matches a reference voltage; and a control circuit which brings the regulator circuit to a power saving mode when the step-up ratio of 1.0 is designated.

By turning off elements such as an oscillator circuit constituting the regulator circuit when the voltage regulation by the regulator circuit is not performed, reduction in power consumption is achieved.

The regulator circuit may comprise: a first transistor provided between an input terminal and an output terminal of the regulator circuit; a pull up resistor provided between a control terminal of the first transistor and a first fixed potential; a constant current circuit provided between the control terminal of the first transistor and a second fixed potential; a second transistor provided between the control terminal of the first transistor and the second fixed potential; an operational amplifier having its output connected to a control terminal of the second transistor, its non-inverting input supplied with a predetermined reference voltage and its inverting input supplied with a feedback of the output voltage of the boost circuit; a first control switch which performs on and off control of the second transistor; and a second control switch which performs on and off control of the constant current circuit.

When the step-up ratio of 1.0 is designated, the control circuit may close the first control switch of the regulator circuit so as to turn the second transistor off, and close the second control switch so as to turn the constant current circuit on.

The phrase "control terminal" of a transistor refers to a base terminal of a bipolar transistor and a gate terminal of a field effect transistor.

When feedback control by the regulator circuit is performed, the first control switch turns the second transistor on. When feedback control is not performed, the second transistor is turned off so as to block the feedback path. In addition, the first transistor is completely turned on by causing the constant current generated by the constant current circuit to flow in the pull up resistor. With this structure of the regulator circuit, the regulator circuit can be switched between respective states.

When the step-up ratio of 1.0 is designated, the control circuit may turn the operational amplifier off. When the step-up ratio is 1.0, the second transistor is turned off.

Therefore, the feedback path is blocked. In this situation, further reduction in power consumption is achieved by turning the operational amplifier off.

The voltage generating apparatus according to this aspect may further comprise a clock signal generating circuit for a boost operation, wherein the boost circuit is of a charge pump type, and the control circuit brings the clock signal generating circuit to a power saving mode when the step-up ratio of 1.0 is designated.

The constant current circuit may increase the constant current when the step-up ratio of 1.0 is designated for the boost circuit at start-up of the voltage generating apparatus. By gradually increasing the current generated by the constant current circuit, voltage drop across the pull up resistor is gradually increased so that the first transistor is gradually turned on. As a result, generation of an inrush current is properly controlled.

The present invention according to still another aspect provides a boost circuit of a charge pump type. The boost circuit according to this aspect is constructed such that at least two of a plurality of switches operated to charge and discharge the boost capacitance in a boost operation are connected in series on a path connecting a voltage input terminal and a voltage output terminal of the boost circuit, and, when a step-up ratio of 1.0 is designated, the two switches are closed so as to establish a short circuit between the voltage input terminal and the voltage output terminal. According to this aspect, the voltage fed to the voltage input terminal is directly output via the output terminal so that power loss is reduced.

At least two short circuits may be established between the voltage input terminal and the voltage output terminal by closing at least four switches. With this, resistance between the voltage input terminal and the voltage output terminal is reduced.

The present invention according to yet another aspect provides a voltage generating apparatus. The voltage generating apparatus according to this aspect comprises: a boost circuit which boosts an input voltage by a predetermined step-up ratio and outputs an output voltage accordingly; a feedback circuit which regulates the input voltage so that the output voltage matches a reference voltage; and a control circuit which brings the feedback circuit to a power saving mode when the step-up ratio of 1.0 is designated. The voltage generating apparatus may further comprise a clock signal generating circuit for a boost operation, wherein the boost circuit is of a charge pump type, and the control circuit brings the clock signal generating circuit to a power saving mode when the step-up ratio of 1.0 is designated. With this, a voltage generating apparatus capable of reduction in power consumption is provided.

The present invention according to still another aspect provides a voltage generating apparatus. The voltage generating apparatus according to this aspect comprises: a boost circuit which boosts an input voltage by a predetermined step-up ratio and outputs an output voltage accordingly; a feedback circuit which regulates the input voltage so that the output voltage matches a reference voltage; and a switch which establishes a short circuit between an input terminal in the boost circuit for receiving the input voltage and an output terminal for outputting the output voltage, when the step-up ratio of 1.0 is designated. The voltage generating circuit may further comprising a soft start circuit which restricts a current rushing from a given power supply to the input terminal when the short circuit is established between the input terminal and the output terminal in the boost circuit. By providing a soft start circuit, a voltage generating apparatus capable of suppressing an inrush current is provided.

The present invention according to yet another aspect provides an electronic apparatus. The electronic apparatus according to this aspect comprises: a regulator circuit to which a voltage is applied from a given power supply; a boost circuit which boosts an output from the regulator circuit; a load which is driven by an output of the boost circuit; and a switch which, under a predetermined condition, forms a path that skips a voltage-related operation by the regulator circuit and the boost circuit and that applies the voltage from the power supply directly to the load. The phrase "given power supply" refers, for example, to a battery. The electronic apparatus may be a cell phone, for example. According to this aspect, the voltage fed from the given power is directly applied to the load so that power loss is reduced.

The present invention according to still another aspect provides a voltage generating apparatus. The voltage generating apparatus according to this aspect comprises: a boost circuit which boosts an input voltage by a predetermined step-up ratio and outputs an output voltage accordingly; a feedback circuit which regulates the input voltage so that the output voltage matches a reference voltage; a control circuit which brings the feedback circuit to a power saving mode when the step-up ratio of 1.0 is designated; a soft start circuit which restricts a current flowing from a given power supply to an input terminal for receiving the input voltage, wherein the feedback circuit controls the conduction level of a transistor between the given power supply and the input terminal, and when the step-up ratio of 1.0 is designated, the control circuit brings the feedback circuit to a power saving mode, the operation of the control circuit is invalidated, the transistor is completely turned on, and the soft start circuit controls, via the transistor completely turned on, an inrush current from the given power supply to the input terminal. By providing a soft start circuit, a voltage generating apparatus capable of suppressing an inrush current is provided.

It is to be noted that any arbitrary combination or rearrangement of the above-described structural components and so forth are all effective as and encompassed by the present embodiments. Moreover, this summary of the invention does not necessarily describe all necessary features so that the invention may also be sub-combination of these described features.

DETAILED DESCRIPTION OF THE INVENTION

Figure 1:
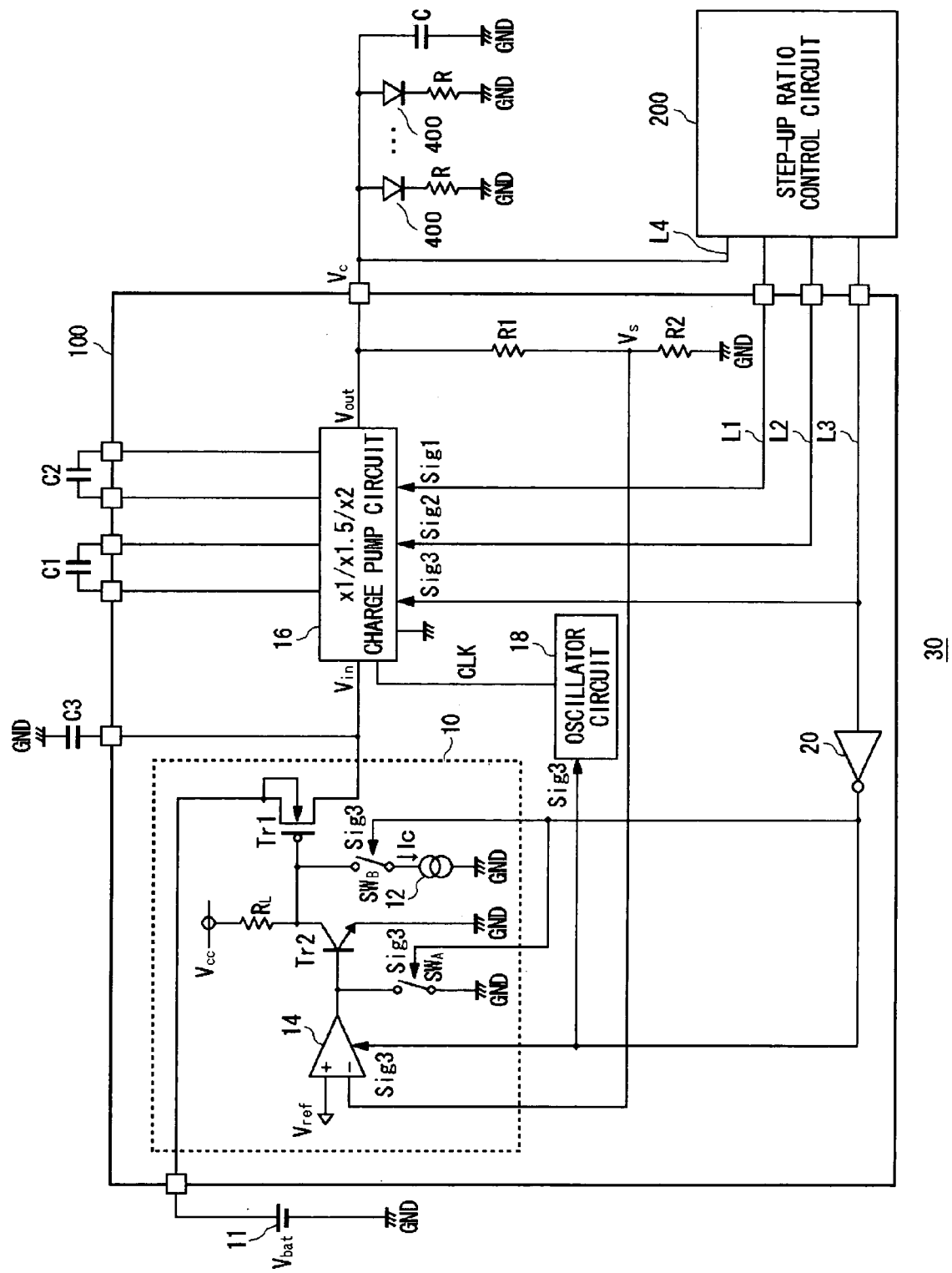
FIG. 1 illustrates the structure of a voltage generating apparatus according to an embodiment.

The invention will now be described based on preferred embodiments which do not intend to limit the scope of the present invention but exemplify the invention. All of the features and the combinations thereof described in the embodiment are not necessarily essential to the invention.

A summary of an embodiment of the present invention will be given. The voltage generating apparatus according to the embodiment is used in electronic apparatuses including battery-driven portable equipment such as cell phones and PDAs. A drive voltage, obtained by boosting the battery voltage of a lithium ion battery or the like, is supplied to LEDs used as backlight provided in the portable equipment. The life of a battery built in the portable equipment is limited. In order to extend the life, current consumption should preferably be reduced. The voltage generating apparatus according to the embodiment achieves reduced power consumption by reducing consumption current flowing in the circuit. Further, by reducing an inrush current occurring in certain conditions, the voltage generating apparatus minimizes adverse effects on and improper operation of the elements inside the circuit and the LEDs, thereby achieving proper light emission of the LEDs.

The voltage generating apparatus according to the embodiment is provided with a charge pump circuit. By using the charge pump circuit, the voltage generating apparatus boosts the battery voltage so as to supply a voltage capable of driving the LEDs. The voltage generating apparatus is capable of designating a step-up ratio of 1.0, 1.5 or 2.0 in the charge-pump circuit. The characterizing feature of the embodiment is that, in the ×1.5 mode or the ×2.0 mode, the voltage generating apparatus controls the battery voltage to a predetermined target voltage value and outputs an output voltage boosted to a level 1.5 times or 2.0 times the controlled voltage. On the contrary, in the ×1.0 mode, the voltage generating apparatus leaves unprocessed the battery voltage applied to the voltage generating apparatus and outputs it as an output voltage. In the ×1.0 mode, no control is applied to bring the battery voltage to a predetermined target voltage value. The above mode, in which the battery voltage left unprocessed is output, will be referred to as a short mode. The voltage generating apparatus enables this mode when a step-up ratio of 1.0 is designated.

As mentioned above, when the step-up ratio set in the charge pump circuit is 1.5 or 2.0, the voltage generating apparatus controls the battery voltage applied to an input terminal of the voltage generating apparatus to a predetermined target voltage value. The voltage generating apparatus feeds the controlled voltage to an input terminal of the charge pump circuit. The voltage generating apparatus also performs on/off control of switches provided in the charge pump circuit so as to boost the voltage input to the circuit by a step-up ratio of 1.5 or 2.0. The boosted voltage is supplied to the LEDs via an output terminal of the charge pump circuit. With this, a voltage 1.5 or 2.0 times the battery voltage controlled to a predetermined target level is supplied to the LEDs as a drive voltage. In case, for example, the battery voltage applied to the voltage generating apparatus is 3.6V and the voltage necessary to drive the LEDs is 4.5V, the battery voltage is first controlled to be 3.0V, a target voltage value. The controlled voltage is boosted by a factor of 1.5 by the charge pump circuit. In this way, the drive voltage of 4.5V can be supplied to the LEDs.

When the step-up ratio set in the charge pump circuit is 1.0, the voltage generating apparatus does not control the battery voltage applied to the input terminal of the circuit to a target voltage value. Instead, the voltage generating apparatus outputs the battery voltage left unprocessed to the input terminal of the charge pump circuit. Since the input terminal and output terminal of the charge pump circuit are short-circuited, the drive voltage that is essentially equal to the battery voltage can be supplied to the LEDs as a drive voltage. With this, the short mode is enabled. In case, for example, the battery voltage applied to the voltage generating apparatus is 3.6V and the voltage necessary to drive the LEDs is 3.6V, the battery voltage left unprocessed can be supplied to the LEDs as the drive voltage, by enabling the short mode. In this case, however, an inrush current from the battery voltage is generated. To address this, there is provided a circuit to control the inrush current. The details for this will be given later.

As mentioned before, the battery voltage is not controlled to a target voltage value when the short mode is enabled. Therefore, the operation of the circuit for this control is suspended. Further, the operation of an oscillator circuit for repeatedly performing on/off control of switches provided between the input terminal and the output terminal of the charge pump circuit is suspended, by establishing a short circuit between the input terminal and the output terminal of the charge pump circuit. With this, the current to feed through the circuit that is a target for suspension can be reduced so that considerable power-saving advantage is obtained.

FIG. 1 illustrates the structure of a voltage generating apparatus 30 according to an embodiment. The voltage generating apparatus 30 includes a voltage generating circuit 100 and a step-up gain control circuit 200. The voltage generating circuit 100 is connected to the step-up gain control circuit 200 via a first signal line L1, a second signal line L2, a third signal line L3 and a fourth signal line L4. The voltage generating circuit 100 supplies a boosted voltage Vc to the step-up ratio control circuit 200 via the fourth signal line L4. The step-up ratio control circuit 200 supplies a first signal Sig1, a second signal Sig2 and a third signal Sig3 via the first signal line L1, the second signal line L2 and the third signal line L3, respectively.

The voltage generating circuit 100 is provided with a charge pump circuit 16 for boosting an input voltage Vin by a preset step-up ratio, a regulator circuit 10 for maintaining the input voltage Vin input to the charge pump circuit 16 to be constant, an oscillator circuit 18 for supplying a clock signal CLK to the charge pump circuit 16, voltage dividing resistors R1 and R2 generating an output level indicator voltage Vs which is a target for monitoring, and an inverting circuit 20. The first signal Sig1, the second signal Sig2 and the third signal Sig3 from the step-up ratio control circuit 200 are fed to the charge pump circuit 16. The third signal Sig3 from the step-up ratio control circuit 200 is inverted by the inverting circuit 20 before being fed to the oscillator circuit 18, an operational amplifier 14 inside the regulator circuit 10, a first control switch $SW_A$ and a second control switch $SW_B$. The structure of the charge pump circuit 16, the regulator circuit 10 and the step-up ratio control circuit 200 will be described later.

The voltage generating circuit 100 is fed a battery voltage Vbat from a lithium ion battery 11. The charge pump circuit 16 uses boost capacitors C1 and C2 external to the voltage generating circuit 100 for charge pump boost so as to output a boosted voltage Vc. A plurality of LEDs 400 and a smoothing capacitor C are connected in parallel to an output terminal of the voltage generating circuit 100 and are connected to the ground GND via resistors R. The voltage generating circuit 100 boosts the battery voltage Vbat to the boosted voltage Vc of 4.5-5.0V, which is supplied to drive the LEDs 400 connected in parallel.

The charge pump circuit 16 is a boost circuit that selectively charges and discharges the boost capacitors C1 and C2 according to an on/off operation of internal switches, so as to boost the input voltage Vin by a preset step-up ratio and output an output voltage Vout. The step-up ratios of 2.0, 1.5 and 1.0 are achieved by one of the first signal Sig1, the second signal Sig2 and the third signal Sig3 supplied to the first signal line L1, the second signal line L2 and the third signal L3, respectively, being brought to a high level and the other two signals being brought to a low level. More specifically, when the first signal Sig1 is high and the other two signals are low, a step-up ratio of 2.0 is set in the charge pump circuit 16. When the second signal Sig2 is high and the other two signals are low, a step-up ratio of 1.5 is set. When the third signal Sig3 is high and the other two signals are low, a step-up ratio of 1.0 is set. An output level indicator voltage Vs obtained by dividing the output voltage Vout of the charge pump circuit 16 by the two resistors R1 and R2 is fed back to regulator circuit 10.

The regulator circuit 10 is provided with the operational amplifier 14 for comparing a reference voltage Vref with the output level indicator voltage Vs, a second common emitter transistor Tr2 of an npn type having its base connected to an output of the operational amplifier 14, the first control switch $SW_A$ connected between the base of the second transistor Tr2 and the ground GND, a pull-up resistor $R_L$ connected to the collector of the second transistor Tr2, a power supply line Vcc supplying power via the pull-up resistor $R_L$, a PMOS first transistor Tr1 having its gate connected to a node between the second transistor Tr2 and the pull-up resistor $R_L$ and its source connected to the anode of the lithium ion battery 11, the second control switch $SW_B$ connected in series between the gate of the first transistor Tr1 and the ground GND, and a constant current circuit 12.

The operational amplifier 14 compares the reference voltage Vref from a reference voltage source with the output level indicator voltage Vs from the charge pump circuit 16. The operational amplifier 14 controls the conduction level of the first transistor Tr1 via the second transistor Tr2 in accordance with an error voltage determined from the comparison. With this operation, the regulator circuit 10 regulates the battery voltage Vbat so as to stabilize the input voltage Vin to settle at a target voltage value. The regulator circuit 10 supplies the input voltage Vin to the charge pump circuit 16. By controlling a difference between the output level indicator voltage Vs and the reference voltage Vref to be 0, the input voltage Vin input to the charge pump circuit 16 is settled at a target voltage value. That is, the operational amplifier 14 functions as a feedback circuit that subjects the input voltage Vin of the charge pump circuit 16 to feedback control such that the output level indicator voltage Vs matches the reference voltage Vref.

In case Vs<Vref, a relatively large current flows through the pull up resistor $R_L$ by increasing the conduction level of the second transistor Tr2. In this state, the gate voltage of the first transistor Tr1 is relatively low so that the conduction level of the first transistor Tr1 is increased. With this, the input voltage Vin input to the charge pump circuit 16 is increased. As a result, the output level indicator voltage Vs is increased.

In case Vs>Vref, a relatively small current flows through the pull up resistor $R_L$ by decreasing the conduction level of the second transistor Tr2. In this state, the gate voltage of the first transistor Tr1 is relatively high so that the conduction level of the first transistor Tr1 is decreased. With this, the input voltage Vin input to the charge pump circuit 16 is decreased. As a result, the output level indicator voltage Vs is decreased. Thus, the regulator circuit 10 is capable of controlling Vs to be equal to Vref and maintaining the input voltage Vin input to the charge pump circuit 16 at a constant target level.

The operational amplifier 14 is controlled by the third signal Sig3 supplied via the third signal line L3 to suspend its operation in the ×1.0 step-up mode, and to operate in the ×1.5 or ×2.0 step-up mode. More specifically, in the ×1.0 step-up mode, the third signal Sig3 at a high level is sent and inverted by the inverting circuit 20 to a low level, which controls the operational amplifier 14 to suspend its operation. In the ×1.5 or ×2.0 step-up mode, the third signal Sig3 at a low level is sent and inverted by the inverting circuit 20 to a high level, which controls the operational amplifier 14 to operate.

The first control switch $SW_A$ and the second control switch $SW_B$ are controlled by the third signal Sig3 supplied via the third signal line L3 to be closed in the ×1.0 step-up mode and opened in the ×1.5 or ×2.0 step-up mode. More specifically, in the ×1.0 step-up mode, the third signal Sig3 at a high level is sent and inverted by the inverting circuit 20 to a low level, which controls the switches to be closed. In the ×1.5 or ×2.0 step-up mode, the third signal Sig3 at a low level is sent and inverted by the inverting circuit 20 to a high level, which controls the switches to be opened. When the first control switch $SW_A$ is closed, the second transistor Tr2 is completely turned off. When the second control switch $SW_B$ is closed, the constant current circuit 12 feeds a predetermined constant current Ic. In the following description, it is assumed that a signal of high directs a switch to be opened and a signal of low directs a switch to be closed.

The oscillator circuit 18 is a clock signal generating circuit that supplies the clock signal CLK to the charge pump circuit 16. In a similar fashion as the operational amplifier 14, the oscillator circuit 18 is controlled by the third signal Sig3 supplied via the third signal line L3 to suspend its operation in the ×1.0 step-up mode and operate in the ×1.5 or ×2.0 step-up mode.

Figure 2:
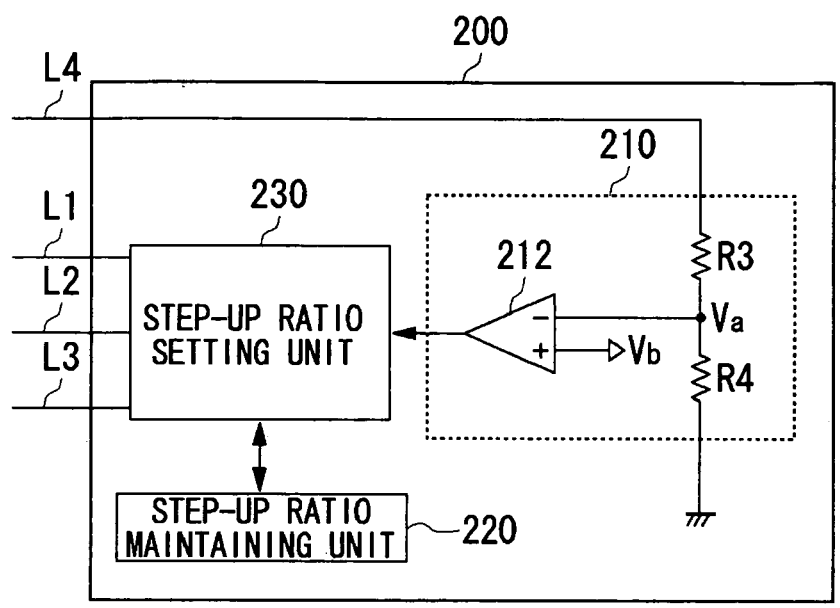
FIG. 2 illustrates the structure of a step-up gain control circuit of FIG. 1.

FIG. 2 illustrates the structure of the step-up ratio control circuit 200. The step-up ratio control circuit 200 is provided with a boosted voltage comparison unit 210 for comparing the boosted voltage Vc supplied from the voltage control circuit 100 with a predetermined reference voltage and outputting a signal at a high level or a low level, a step-up ratio maintaining unit 220 for maintaining the step-up ratio of the charge pump circuit 16, and a step-up ratio setting unit 230 for setting a step-up ratio of the charge pump circuit 16 via the first signal line L1, the second signal line L2 and the third signal line L3, for performing on/off control of the first control switch $SW_A$ and the second control switch $SW_B$ via the third signal line L3, and for controlling the operational amplifier 14 and the oscillator circuit 18 for operation and suspension.

The boosted voltage comparison unit 210 is provided with voltage dividing resistors R3 and R4 for generating a boosted level indicator voltage Va, and with a voltage comparator 212. The voltage comparator 212 of the boosted voltage comparison unit 210 compares the boosted level indicator voltage Va obtained by dividing the boosted voltage Vc by the two voltage dividing resistors R3 and R4, with a reference boosted voltage Vb. When the boosted level indicator voltage Va is lower than the reference boosted voltage Vb, the boosted voltage comparison unit 210 outputs a signal at a high-low level to the step-up ratio setting unit 230. When the contrary is the case, the boosted voltage comparison unit 210 outputs a signal at a low level.

The step-up ratio maintaining unit 220 maintains the step-up ratio. For example, the step-up ratio maintaining unit 220 could be implemented by a 2-bit register. The register could store a binary parameter "00" designating the step-up ratio of 1.0, "01" designating the step-up ratio of 1.5 and "10" designating the step-up ratio of 2.0.

The step-up ratio setting unit 230 reads out the step-up ratio maintained in the step-up ratio maintaining unit 220. When the signal supplied from the boosted voltage comparison unit 210 is at a high level, the step-up ratio setting unit 230 sends a step-up ratio one step higher than the step-up ratio read out, to the voltage generating circuit 100 via the first signal line L1, the second signal line L2 and the third signal line L3. When the signal from the boosted voltage comparison unit 210 is at a low level, the step-up ratio setting unit 230 sends a step-up ratio one step lower than the step-up ratio read out. The step-up ratio setting unit 230 causes the step-up ratio thus sent to be maintained in the step-up ratio maintaining unit 220. For example, when the step-up ratio read out from the step-up ratio maintaining unit 220 is 1.5 and the signal from the boosted voltage comparison unit 210 is at a high level, the step-up ratio setting unit 230 sends a high level to the first signal line L1, a low level to the second signal line L2 and a low level to the third signal line L3. Further, the step-up ratio setting unit 230 causes the step-up ratio maintaining unit 220 to store a binary parameter "10" designating the step-up ratio of 2.0.

Figure 3:
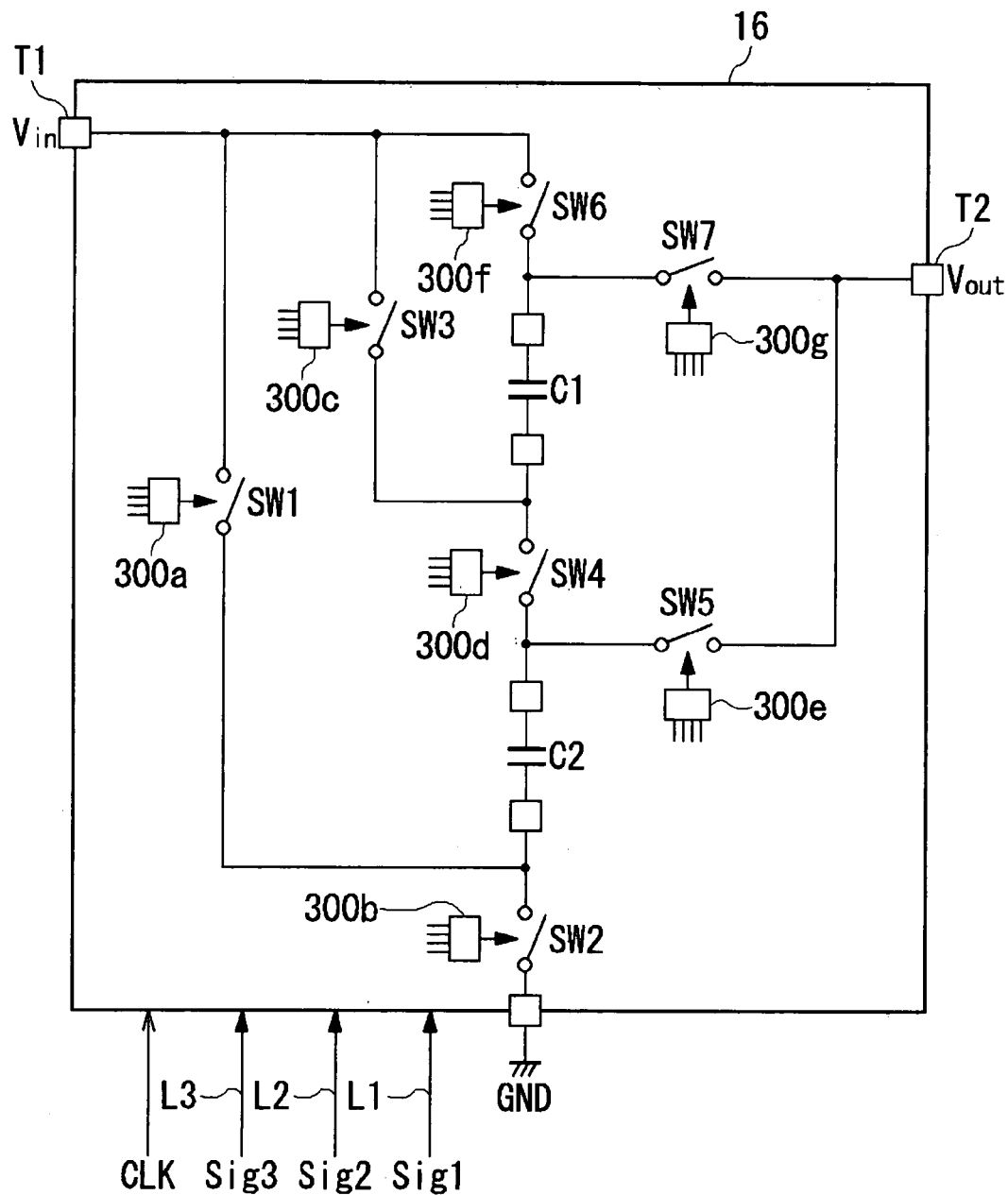
FIG. 3 illustrates the structure of a charge pump of FIG. 1.

FIG. 3 illustrates the structure of the charge pump circuit 16. The charge pump circuit 16 switches between different modes of connection of the two boost capacitors C1 and C2 and between different timing schedules for charging and discharging the boost capacitors C1 and C2, by closing and opening first through seventh switches SW1-SW7 in accordance with the high and low levels of output signals from first through seventh switching control circuits 300a-300g. Through this operation, the charge pump circuit 16 boosts the input voltage Vin applied to an input terminal T1 to the output voltage Vout and outputs the voltage Vout from an output terminal T2.

In describing the two ends of each of the switches, the end located closer to the top of the figure will be referred to as the upper end, the end located closer to the bottom will be referred to as the lower end, the end located on the left will be referred to as the left end, and the end located on the right will be referred to as the right end. The input voltage Vin input via the input terminal T1 is fed to the upper end of the first switch SW1. The lower end of the first switch SW1 is connected to the upper end of the second switch SW2 and an end of the boost capacitor C2. The lower end of the second switch SW2 is connected to the ground GND. The other end of the boost capacitor C2 is connected to the lower end of the fourth switch SW4 and the left end of the fifth switch SW5. The upper end of the fourth switch SW4 is connected to the lower end of the third switch SW3 and an end of the boost capacitor C1. The input voltage Vin is applied to the upper end of the third switch SW3. The other end of the boost capacitor C1 is connected to the lower end of the sixth switch SW6 and the left end of the seventh switch SW7. The input voltage Vin is applied to the upper end of the sixth switch SW6. The output voltage Vout occurs at the right end of the fifth switch SW5 and the right end of the seventh switch SW7 and is output via the output terminal T2.

The first through seventh switching control circuits 300a-300g provided in the charge pump circuit 16 perform on/off control of the first through seventh switches SW1-SW7 in accordance with the first signal Sig1, the second signal Sig2 and the third signal Sig3 sent from the step-up ratio control circuit 200 as well as the clock signal CLK supplied from the oscillator circuit 18. Four signal lines for supplying these signals would be, if properly illustrated, connected to the first through seventh switching control circuits 300a-300g. To prevent the illustration from becoming too complicated, the signal lines are illustrated as entering the interface to the charge pump circuit 16. In the description that follows, the first through seventh switching control circuits 300a-300g will also be generically referred to as switching control circuits 300.

Figure 4:
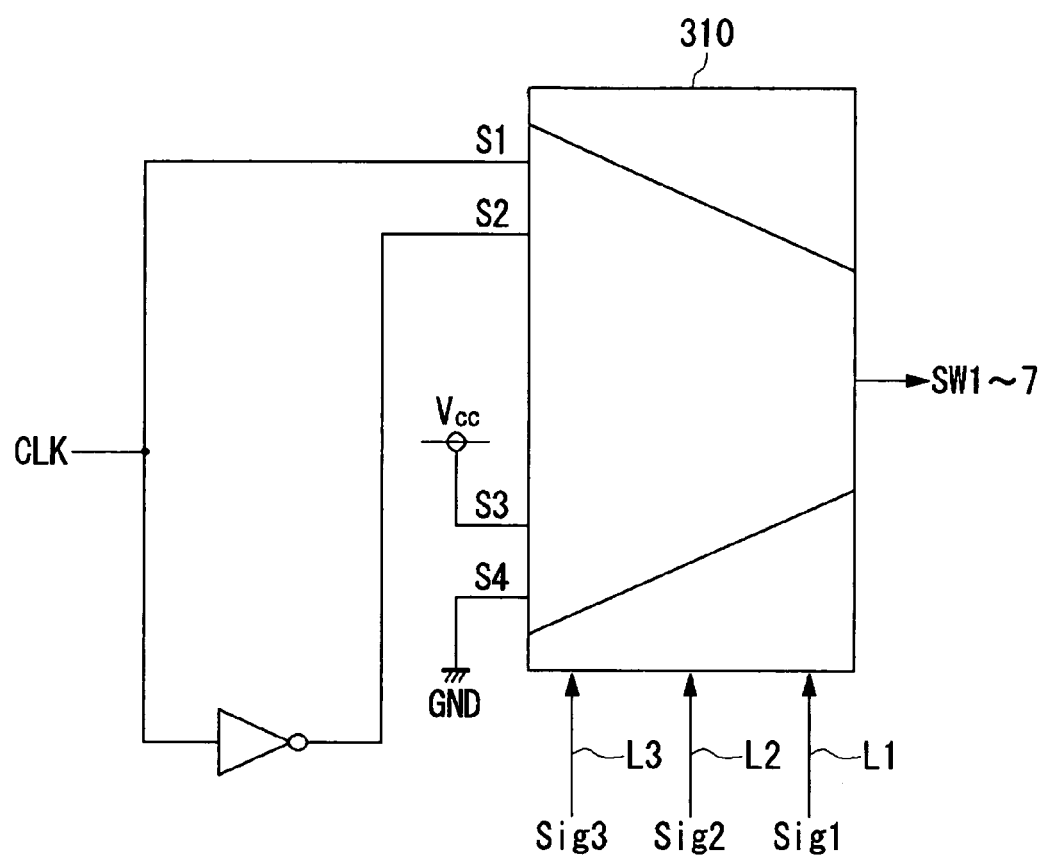
FIG. 4 illustrates the structure of a switching control circuit of FIG. 3.

FIG. 4 illustrates the structure of the switching control circuit 300. The structure of each of the first through seventh switching control circuits 300a-300g is illustrated in a single diagram. Internally, the first through seventh control circuits 300a-300g are designed individually. Responsive to the first signal Sig1, the second signal Sig2 and the third signal Sig3, each of the first through seventh switching control circuits 300a-300g selects one of four input signals described later and provides an output accordingly.

The switching control circuit 300 is provided with a selector 310. Responsive to the first signal Sig1, the second signal Sig2 and the third signal Sig3, the selector 310 selects one of a first input signal S1, a non-inverted version of the clock signal CLK, a second input signal S2, an inverted version of the clock signal CLK, a third input signal S3 at a high level supplied from the power supply line Vcc, and a fourth input signal S4 at a low level supplied from the ground GND. The selector 310 sends the selected signal to a corresponding one of the first through seventh switches SW1-SW7.

Figure 5:
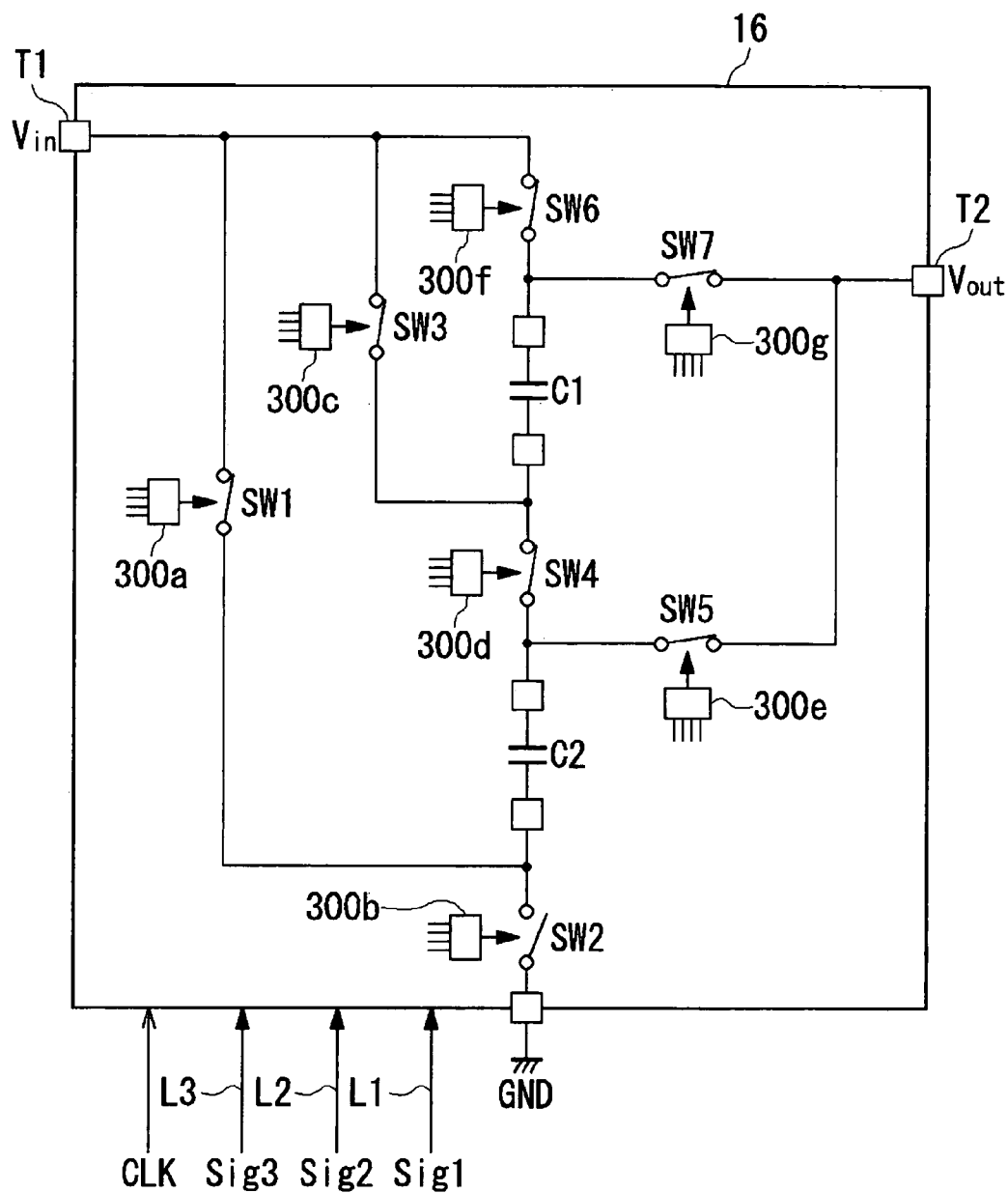
FIG. 5 illustrates how switches are closed or opened when the step-up ratio of the charge pump circuit of FIG. 3 is set to 1.0.

A description will first be given of the case where the step-up ratio of 1.0 is to be achieved. FIG. 5 illustrates how the first through seventh switches SW1-SW7 are closed and opened when the when the step-up ratio of 1.0 is to be achieved. As illustrated, as a result of the switching control circuit 300b outputting the third input signal S3 at a high level and the other circuits in the charge pump circuit 16 outputting the fourth input signal S4 at a low level, the second switch SW2 is opened and the other switches are closed. With this, there are created two short circuit paths including a path that leads from the input terminal T1 to the output terminal T2 via the third switch SW3, the fourth switch S4 and the fifth switch SW5, which belong to a first switch group, and a path that leads from the input terminal T1 to the output terminal T2 via the sixth switch SW6 and the seventh switch SW7, which belong to a second switch group. Due to the two short circuit paths, resistance between the input terminal T1 and the output terminal T2 is reduced as compared to a case where there is only one short circuit path. When the step-up ratio of 1.0 is to be achieved, either the third input signal S3 or the fourth input signal S4 is selected. Therefore, the first input signal S1, a non-inverted version of the clock signal CLK, and the second input signal S2, an inverted version of the clock signal CLK are not necessary. Accordingly, the operation of the oscillator circuit 18 supplying the clock signal CLK is not necessary.

Figure 6:
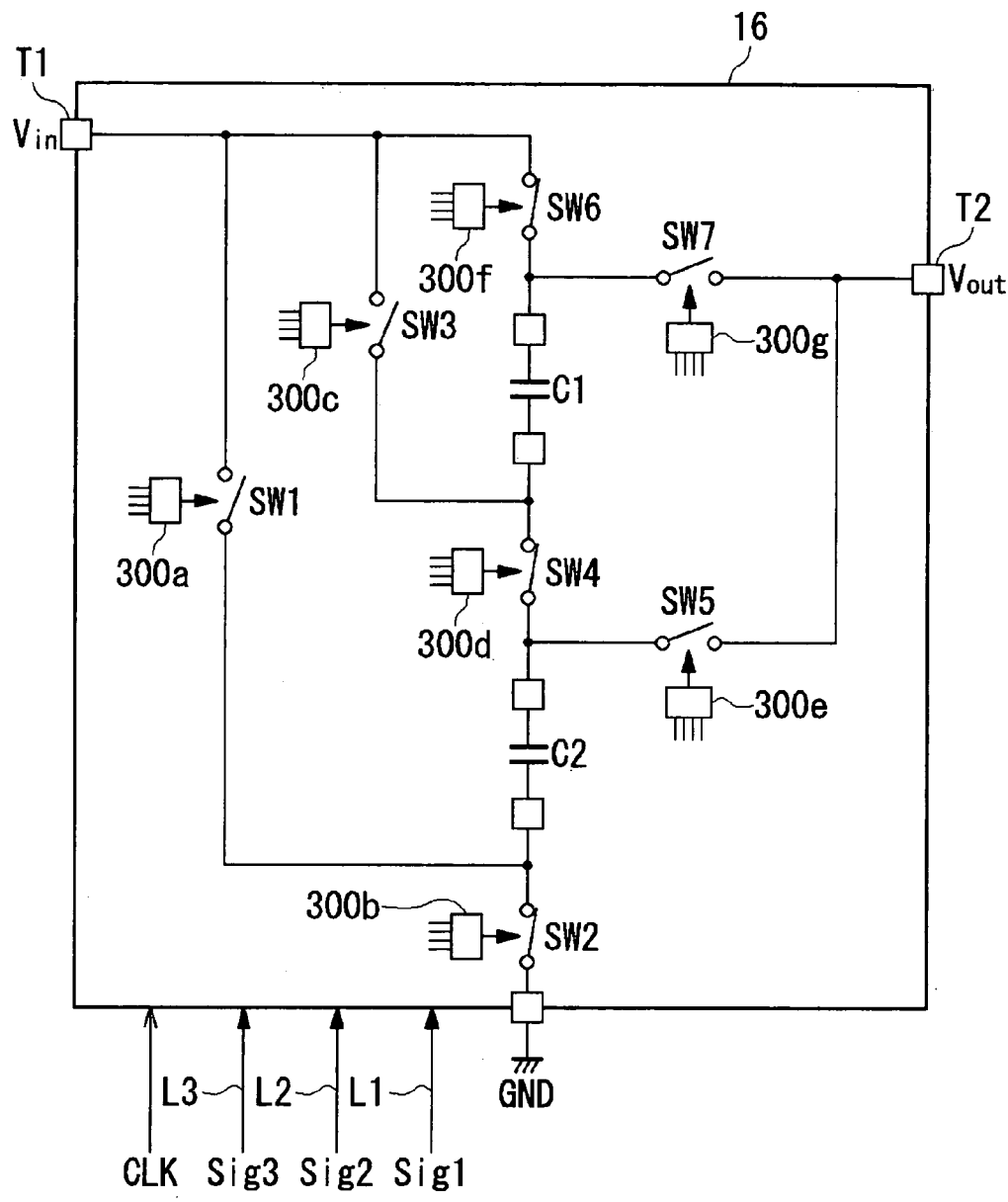
FIG. 6 illustrates how the switches are closed or opened in a charge period when the step-up ratio of the charge pump circuit of FIG. 3 is set to 1.5.

A description will now be given of how the step-up ratio of 1.5 is achieved. FIG. 6 illustrates how the first through seventh switches SW1-SW7 are closed and opened in a first phase in the timing schedule for switching. In the first phase, the clock signal from the oscillator circuit 18 is at a high level. Therefore, the switching control circuits 300b, 300d and 300f output the second input signal S2 at a low level. The other circuits output the first input signal S1 at a high level. With this, the second switch SW2, the fourth switch SW4 and the sixth switch SW6 are closed and the other switches are opened. This forms a circuit connecting the two boost capacitors C1 and C2 in series so that the two boost capacitors C1 and C2 are charged by the power of the input voltage Vin until a second stage in the timing schedule arrives. With this, a voltage equal to 0.5Vin is applied across each of the boost capacitors C1 and C2.

Figure 7:
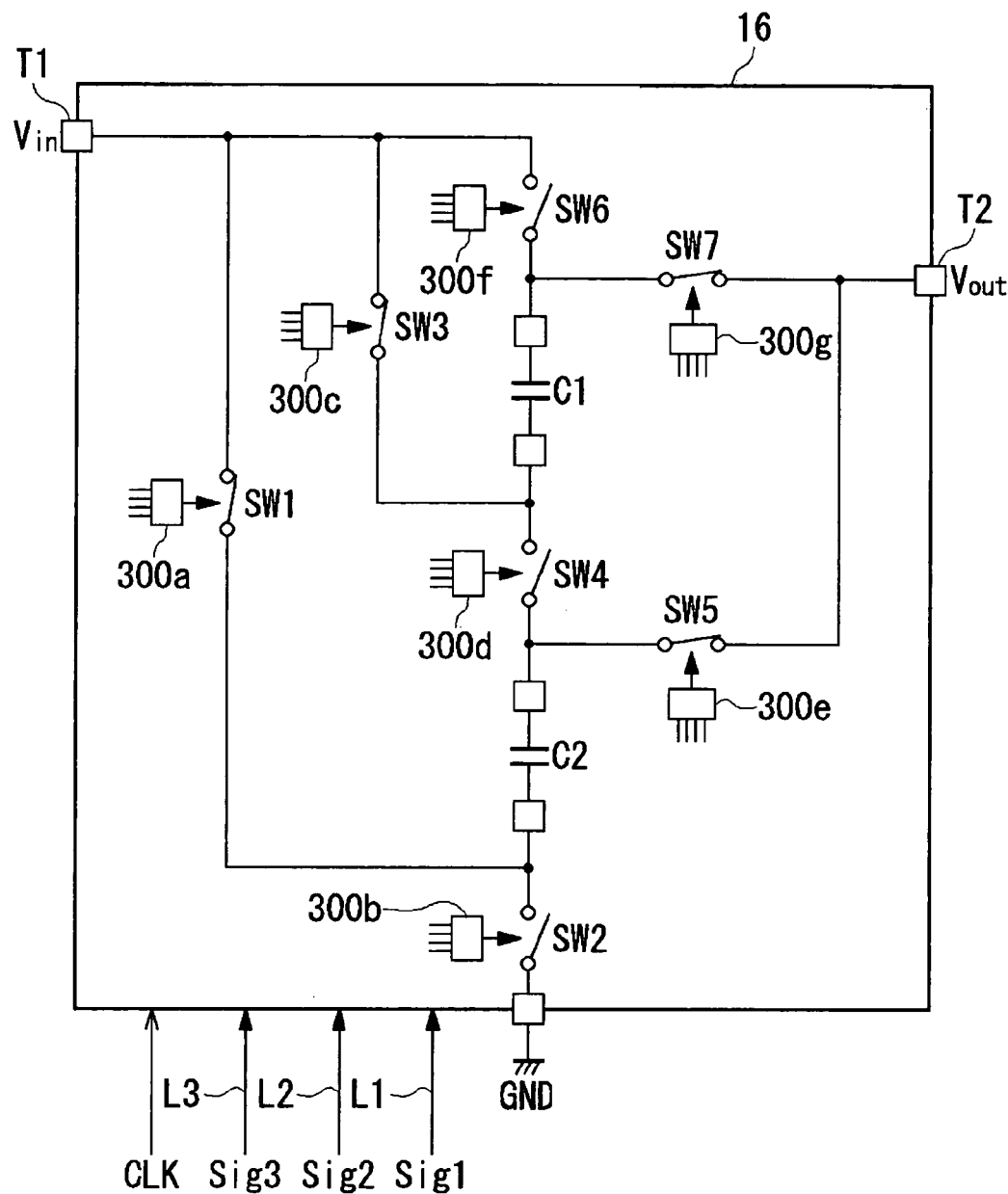
FIG. 7 illustrates how the switches are closed or opened in a discharge period when the step-up ratio of the charge pump circuit of FIG. 3 is set to 1.5.

FIG. 7 illustrates how the first through seventh switches SW1-SW7 are closed and opened in a second phase in the timing schedule for switching. In the second phase, the clock signal from the oscillator circuit 18 is at a low level. Therefore, the switching control circuits 300b, 300d and 300f output the second input signal S2 at a high level. The other circuits output the first input signal S1 at a low level. As a result, the second switch SW2, the fourth switch SW4 and the sixth switch SW6, which are closed in the first phase, are opened. On the contrary, the first switch SW1, the third switch SW3 and the seventh switch SW7 are closed. With this, the two boost capacitors C1 and C2 are connected in parallel. The input voltage Vin is applied to the two boost capacitors C1 and C2, which are charged by the voltage equal to 0.5Vin, in a direction reversed to the direction occurring in the charge period. Thereby, the two boost capacitors C1 and C2 are discharged and the power is supplied to the output terminal T2. With this, the voltage equal to 0.5Vin from the two boost capacitors C1 and C2 is superimposed on the input voltage Vin so that the output voltage Vout becomes 1.5Vin.

By alternately closing and opening each of the first through seventh switches SW1-SW7 in the first phase and in the second phase, in accordance with the high level or the low level of the clock signal CLK from the oscillator circuit 18, the charge pump circuit 16 repeatedly charges and discharges the two boost capacitors C1 and C2 so as to output the output voltage Vout boosted to a level 1.5 times the input voltage Vin.

Figure 8:
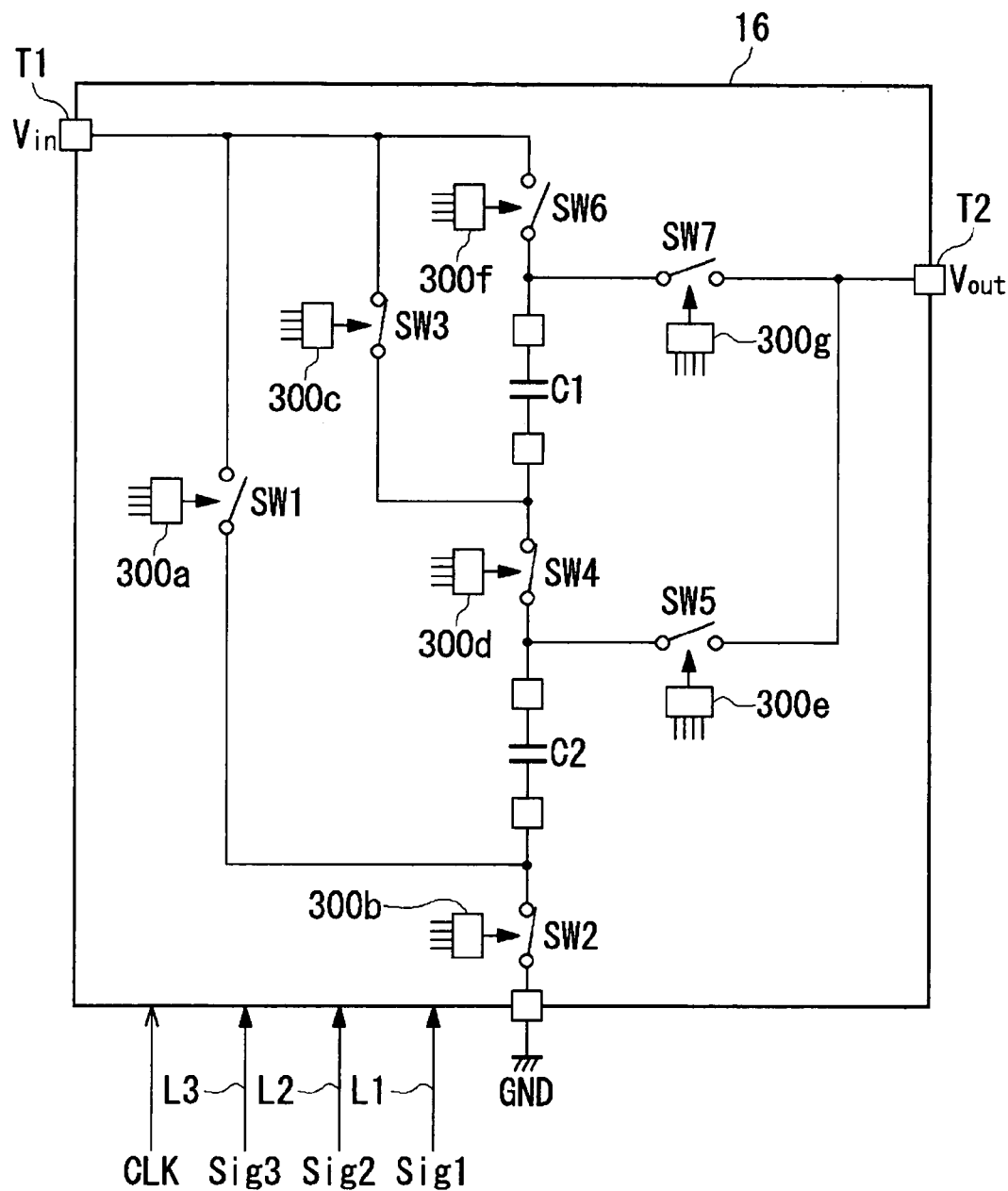
FIG. 8 illustrates how the switches are closed or opened in a charge period when the step-up ratio of the charge pump circuit of FIG. 3 is set to 2.0.

A description will now be given of how the step-up ratio of 2.0 is achieved. FIG. 8 illustrates how the first through seventh switches SW1-SW7 are closed and opened in a first phase in the timing schedule for switching. In the first phase, the clock signal CLK from the oscillator circuit 18 is at a high level. Therefore, the switching control circuits 300b, 300c and 300d output the second input signal S2 at a low level. The other circuits output the first input signal S1 at a high level. As a result, the second switch SW2, the third switch SW3 and the fourth switch SW4 are closed. The other switches are opened. With this, a circuit connecting the two boost capacitors C1 and C2 in parallel is formed so that the two boost capacitors C1 and C2 are charged by the input voltage Vin until a second phase arrives. With this, a voltage equal to Vin is applied across each of the boost capacitors C1 and C2.

Figure 9:
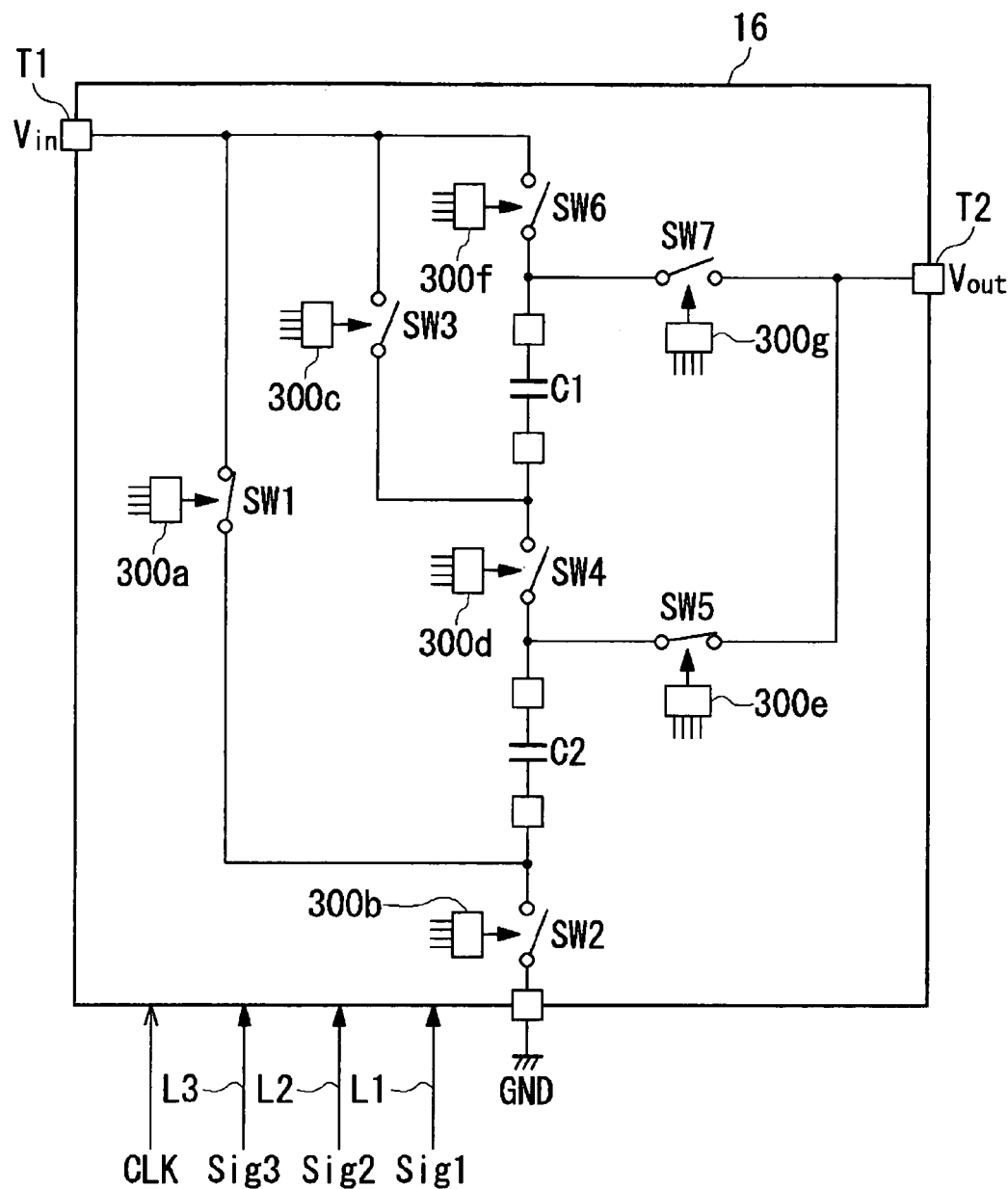
FIG. 9 illustrates how the switches are closed or opened in a discharge period when the step-up ratio of the charge pump circuit of FIG. 3 is set to 2.0.

FIG. 9 illustrates how the first through seventh switches SW1-SW7 are closed and opened in the second phase in the timing schedule for switching. In the second phase, the clock signal CLK from the oscillator circuit 18 is at a low level. Therefore, the switching control circuits 300b, 300c and 300d output the second input signal S2 at a low level. The other circuits output the first input signal S1 at a high level. As a result, the second switch SW2, the third switch SW3 and the fourth switch SW4, which are closed in the first phase, are opened. On the contrary, the first switch SW1 and the fifth switch SW5 are closed. With this, the two boost capacitors C1 and C2 are connected in parallel. The input voltage Vin is applied to the two boost capacitors C1 and C2, which are charged by the voltage equal to Vin, in a direction reversed to the direction occurring in the charge period. Thereby, the two boost capacitors C1 and C2 are discharged and the power is supplied to the output terminal T2. With this, the voltage equal to Vin from the two boost capacitors C1 and C2 is superimposed on the input voltage Vin so that the output voltage Vout becomes 2.0Vin.

By alternately closing and opening each of the first through seventh switches SW1-SW7 in the first phase and in the second phase, in accordance with the high level or the low level of the clock signal CLK from the oscillator circuit 18, the charge pump circuit 16 repeatedly charges and discharges the two boost capacitors C1 and C2 so as to output the output voltage Vout boosted to a level 2.0 times the input voltage Vin.

Described above is the structure of the voltage generating apparatus 30. A description will now be given of the operation in this structure.

At power-on of the voltage generating apparatus 30, the step-up ratio of the charge pump circuit 16 is set to 1.0. In order to achieve the step-up ratio of 1.0, the step-up ratio setting unit 230 generates the first signal Sig1 at a low level, the second signal Sig2 at a low level and the third signal Sig3 at a high level. The step-up ratio setting unit 230 sends the first signal Sig1, the second signal Sig2 and the third signal Sig3 to the charge pump circuit 16 via the first signal line L1, the second signal line L2 and the third signal line L3, respectively. As described above, the step-up ratio of 1.0, i.e., the short mode, is achieved by the switching control circuit 300 performing on/off control of the first through seventh switches SW1-SW7 in accordance with aforementioned signals.

In this state, the third signal Sig3 supplied from the step-up ratio control circuit 200 via the third signal line L3 is inverted by the inverting circuit 20 to a low level, which closes the first control switch $SW_A$. As a result of the first control switch $SW_A$ being closed, the second transistor Tr2 is turned off. As a result, control of the first transistor Tr1 by the operational amplifier 14 via the second transistor Tr2 invalidated.

In this state, the third signal Sig3 sent by the step-up ratio control circuit 200 is inverted by the inverting circuit 20 to a low level, which closes the second control switch $SW_B$. As a result of the second control switch $SW_B$ being closed, the constant current Ic generated by the constant current circuit 12 flows in the pull up resistor $R_L$. The constant current creates a voltage drop of $R_L \times Ic$ in the pull up resistor $R_L$. The voltage drop in the pull up resistor $R_L$ is applied across the gate and the source of the first transistor Tr1 so that the first transistor Tr1 is completed turned on. With this, the battery voltage Vbat of the lithium ion battery 11 is directly supplied to the LED 400 with reduced power loss.

When the first control switch $SW_A$ is closed by the step-up ratio control circuit 200, an inrush current from the battery voltage Vbat of the lithium ion battery 11 flows into the charge pump circuit 16. The third signal Sig3 sent by the step-up ratio control circuit 200 is inverted by the inverting circuit 20 to a low level, which closes the second control switch $SW_B$. The constant current Ic generated by the constant current circuit 12 is gradually increased so as to gradually turn on the first transistor Tr1. With this, the voltage drop in the pull up resistor $R_L$, i.e., the gate-source voltage of the first transistor Tr1 grows gradually in accordance with an increase in the constant current Ic. The first transistor Tr1 gradually leaves an off state and approaches an on state. That is, the constant current circuit 12 and the pull up resistor $R_L$ function as a soft start circuit. According to this soft start operation, an inrush current described above is suppressed. As a result, it is possible to reduce adverse effects on various circuits in the voltage generating apparatus 30 and externally coupled loads such as the LEDs 400.

The third signal Sig3 sent by the step-up ratio control circuit 200 is inverted by the inverting circuit 20 to a low level and is forwarded to the operational amplifier 14 to suspend its operation. This is because, as described above, control of the first transistor Tr1 by the operational amplifier 14 is invalidated so that it is not necessary to operate the operation amplifier 14. Further, the third signal Sig3 sent by the step-up ratio control circuit 200 is inverted by the inverting circuit 20 to a low level and is forwarded to the oscillator circuit 18 to suspend its operation. This is because a short circuit is established between the input terminal and the output terminal of the charge pump circuit 16, so that it not necessary to operate the oscillator circuit 18 for supplying the clock signal CLK that performs alternate on/off control of the switches inside the charge pump circuit 16. With this, the current to feed through the circuit can be reduced so that considerable power-saving advantage is obtained.

When the battery voltage Vbat drops as a result of power consumption in the lithium ion battery 11 due to its prolonged use, the boosted voltage Vc also drops. Accordingly, it is difficult to achieve proper light emission of the LEDs 400. To address this, the boosted voltage comparison unit 210 sends a high level signal to the step-up ratio control unit 230, when the boosted level indicator voltage Va, obtained by dividing the boosted voltage Vc, drops below the reference boosted voltage Vb. The step-up ratio setting unit 230 generates the first signal Sig1 at a low level, the second signal Sig2 at a high level and the third signal Sig3 at a low level for achieving the step-up ratio of 1.5, which is higher than the step-up ratio of 1.0 read out from the step-up ratio maintaining unit 220. The step-up ratio setting unit 230 sends the three signals to the charge pump circuit 16 via the first signal line L1, the second signal line L2 and the third signal line L3.

The third signal Sig3 sent from the step-up ratio control circuit 200 is inverted by the inverting circuit 20 to a high level and is forwarded to the first control switch $SW_A$ and the second control switch $SW_B$ to open these switches. The third signal Sig3 inverted by the inverting circuit 20 to a high level is also sent to the operational amplifier 14 and the oscillator circuit 18 to operate these. As described above, the step-up ratio of 1.5 is achieved by the switching control circuit 300 performing on/off control of the first through seventh switches SW1-SW7 in accordance with the first signal Sig1, the second signal Sig2, the third signal Sig3 and the clock signal CLK supplied from the oscillator circuit 18.

The operational amplifier 14 controls the conduction level of the first transistor Tr1 via the second transistor Tr2 such that the output level indicator voltage Vs matches the reference voltage Vref. In this way, the operational amplifier 14 regulates the input voltage Vin input to the charge pump circuit 16. With this, the battery voltage Vbat input to the voltage generating apparatus 30 is controlled to a predetermined target value. As a result, assuming that the input voltage Vin thus controlled is 0.8 times the Vbat and the step-up ratio of the charge pump circuit is set to 1.5, a drive voltage boosted to a level 1.2 times Vbat is supplied to the LEDs 400. When the battery voltage Vbat drops as the power consumption in the lithium ion battery 11 advances, the voltage generating apparatus 30 raises the step-up ratio of the charge pump circuit from 1.5 to 2.0.

In contrast, when the battery voltage Vbat is increased because of the replacement of the lithium ion battery 11 by a new one or the charging of the battery, the boosted voltage Vc is also increased. When the boosted level indicator voltage Va obtained by dividing the boosted voltage Vc exceeds the reference boosted voltage Vb, the boosted voltage comparison unit 210 sends a low level signal to the step-up ratio setting unit 230. When the step-up ratio read out from the step-up ratio maintaining unit 220 is 2.0, the step-up ratio setting unit 230 generates the first signal Sig1 at a low level, the second signal Sig2 at a high level and the third signal Sig3 at a low level for achieving the step-up ratio of 1.5, one step lower than the ratio read out. The step-up ratio setting unit 230 sends the three signals to the charge pump circuit 16 via the first signal line L1, the second signal line L2 and the third signal line L3 so as to achieve the step-up ratio of 1.5.

Thus, by switching to an appropriate step-up ratio in accordance with the battery voltage Vbat of the lithium ion battery 11, proper light emission of the LEDs is maintained. Further, the voltage generating apparatus 30 is capable of extending the life of the lithium ion battery 11 by reducing a consumption current fed through the circuit when the short mode is enabled.

As described above, the inventive voltage generating apparatus is used in electronic apparatuses such as portable equipment. In addition to being provided with a circuit for processing essential functions like the communication function, such an electronic apparatus can take advantage of the inventive voltage generating apparatus to suppress a consumption current and an inrush current. In particular, in the case of electronic apparatuses such as portable equipment, battery life is a key factor in the product specification. Therefore, application of the inventive voltage generating apparatus to the electronic apparatus will be useful.

Described above is an explanation based on the embodiment. The embodiment of the present invention is only illustrative in nature and it will be obvious to those skilled in the art that various variations in constituting elements and processes are possible within the scope of the present invention.

Generally, the step-up ratio of the charge pump circuit is determined by the number of boost capacitors used, the mode of their connection for switching, the number of steps provided for boosting, and the configuration for switching between the boost capacitors. In the described embodiment, the number of boost capacitors in the charge pump circuit is 2, and the step-up ratio is switched to 1.0, 1.5 and 2.0. Such a structure is described only by way of example. The structure of a charge pump circuit can be designed flexibly. Different number of boost capacitors and different ranges of step-up ratios would result from different ways of designing.

In the described embodiment, the LEDs 400 are given as an example of load connected to the voltage generating apparatus 30. Alternatively, the load may of course be other equipment operated using the voltage generating apparatus 30 as a source of supplying power. For example, fans, heaters, motors and communication units may be the load.

What is claimed is:

1. A voltage generating apparatus comprising:
a boost circuit which boosts an input voltage by a predetermined step-up ratio and outputs an output voltage accordingly;
a regulator circuit which regulates the input voltage so that the output voltage matches a reference voltage;
a control circuit which brings the regulator circuit to a power saving mode when the step-up ratio of 1.0 is designated;
a first transistor provided between an input terminal and an output terminal of the regulator circuit;
a pull up resistor provided between a control terminal of the first transistor and a first fixed potential;
a constant current circuit provided between the control terminal of the first transistor and a second fixed potential;
a second transistor provided between the control terminal of the first transistor and the second fixed potential;
an operational amplifier having its output connected to a control terminal of the second transistor, its non-inverting input supplied with a predetermined reference voltage and its inverting input supplied with a feedback of the output voltage of the boost circuit;
a first control switch which performs on and off control of the second transistor; and
a second control switch which performs on and off control of the constant current circuit.

2. The voltage generating apparatus according to claim 1, wherein, when the step-up ratio of 1.0 is designated, the control circuit closes the first control switch of the regulator circuit so as to turn the second transistor off and closes the second control switch so as to turn the constant current circuit on.

3. The voltage generating apparatus according to claim 2, wherein, when the step-up ratio of 1.0 is designated, the control circuit turns the operational amplifier off.

4. The voltage generating apparatus according to claim 1, further comprising a clock signal generating circuit for a boost operation, wherein the boost circuit is of a charge pump type, and the control circuit brings the clock signal generating circuit to a power saving mode when the step-up ratio of 1.0 is designated.

5. The voltage generating apparatus according to claim 1, wherein the constant current circuit increases the constant current when the step-up ratio of 1.0 is designated for the boost circuit at start-up of the voltage generating apparatus.

* * * * *